United States Patent [19]

Wagensonner

[11] 3,912,384

[45] Oct. 14, 1975

[54] EQUIPMENT FOR FURNISHING A LIGHT DEPENDENT SIGNAL SUBSTANTIALLY INDEPENDENT OF SHUTTER POSITION TO A MOTION PICTURE CAMERA HAVING A ROTARY SHUTTER

[75] Inventor: Eduard Wagensonner, Aschheim, Germany

[73] Assignee: Agfa-Gevaert Aktiengesellschaft, Leverkusen, Germany

[22] Filed: Oct. 24, 1974

[21] Appl. No.: 517,837

[30] Foreign Application Priority Data
Oct. 31, 1973  Germany............................ 2343572

[52] U.S. Cl. ............................................. 352/141
[51] Int. Cl.².......................................... G03B 7/08
[58] Field of Search ..................................... 352/141

[56] References Cited
UNITED STATES PATENTS
3,391,978  7/1968  Reinsch ............................. 352/141
3,792,485  2/1974  Strauss................................ 352/141
3,817,617  6/1974  Weinert............................... 352/141

*Primary Examiner*—Monroe H. Hayes
*Attorney, Agent, or Firm*—Michael S. Striker

[57] ABSTRACT

The electrical signal furnished by a phototransducer receiving light from the reflecting surface of the rotary shutter is amplified and stored in a capacitor. Discharge of the capacitor through the amplifier is prevented by means of a diode. The capacitor stores the maximum electrical signal generated by the phototransducing element during each shutter rotation. A switch connected in parallel with the capacitor is activated by a projection on a disc rotating in synchronism with the rotary shutter. The signal across the capacitor, which is substantially independent of rotary shutter, position is compared to a reference signal in a differential amplifier, the output of which drives the aperture control mechanism.

14 Claims, 3 Drawing Figures

3,912,384

EQUIPMENT FOR FURNISHING A LIGHT DEPENDENT SIGNAL SUBSTANTIALLY INDEPENDENT OF SHUTTER POSITION TO A MOTION PICTURE CAMERA HAVING A ROTARY SHUTTER

BACKGROUND OF THE INVENTION

The present invention relates to a motion picture camera and in particular to a motion picture camera having an automatic aperture control including a phototransducing element which is responsive to light reflected by a light-reflecting surface of a rotary shutter.

Such cameras have the disadvantage that the light meter reads a different light value when the shutter is stationary and when it is rotating. Even while the shutter is stationary, the value of the signal furnished by the light-measuring circuitry may depend more on the actual position of the shutter than on the ambient light. While the shutter is rotating the light which reaches the light-sensitive (phototransducer) element varies between a minimum and maximum value. In known systems of this type, the inertia of the measuring instrument and the inertia of the aperture control apparatus is counted upon to effect an aperture control which corresponds to the average value between these two extremes. However, when the rotary shutter is first started, the electrical signal which is the light dependent signal may vary as a function of the previous stationary position of the shutter. Such variation of course will lead to incorrect exposure.

SUMMARY OF THE INVENTION

It is an object of the present invention to furnish equipment in a motion picture camera of the above-described type which will insure that the electrical light-dependent signal furnished by the measuring apparatus is substantially independent of the position of the rotary shutter and is the same whether the shutter is rotating or stationary. Further, the light-measuring apparatus is to have a high sensitivity.

The present invention resides in a motion picture camera having a diaphragm, a diaphragm control circuit and a rotary shutter having a light-reflecting surface. It comprises light-sensitive circuit means responsive to light reflected by said light-reflecting surface for furnishing an electrical signal corresponding to the light falling on said light-sensitive circuit means. It further comprises storage means connected to said light-sensitive circuit means for storing said electrical signal thereby furnishing a stored electrical signal. It further comprises a clearing means connected to said storage means for clearing said storage means for a predetermined short time period following a predetermined number of rotations of said rotary shutter. In a preferred embodiment of the present invention the clearing means clear said storage means following each rotation of said rotary shutter. Further, in a preferred embodiment of the present invention the maximum (peak) value of the electrical signal generated during each rotation is stored during the rotation. The light-dependent electrical signal thus remains substantially constant during any one rotation of the rotary shutter. The stored signal is cleared for only a very short time period during each rotation so that a change in the actual ambient light conditions during the following rotation of the rotary shutter may be taken into consideration. The stored electrical signal is thus substantially a D.C. signal, changes in the ambient light resulting in a step change of the D.C. value.

In further preferred embodiments of the present invention, a silicon photoreceiver or other semiconductor phototransducing elements is a part of the light-sensitive circuit means which also comprise an amplifier. The storage means comprise a capacitor, while the clearing means comprise a switch connected in parallel with the capacitor for short-circuiting the capacitor at a predetermined time during the rotation of the shutter. The voltage across the capacitor constitutes the stored electrical signal. In a further preferred embodiment of the present invention this is applied to one input of a differential amplifier the other input of which receives a reference signal and whose output is the signal driving the diaphragm control apparatus. The use of a differential amplifier and in particular of a very high gain differential amplifier with negative feedback has the advantage that its input impedance is high thereby causing the voltage across the capacitor to remain substantially constant during each shutter rotation. The advantage of the silicon photoreceivers is that they respond substantially without time delay.

In a further preferred embodiment of the present invention, the switch means and the projection of the disc operating the switch means are so mounted relative to the rotary shutter that the short-circuiting of the capacitor takes place at the beginning of the phase wherein the shutter covers the aperture, that is at the beginning of the time that light is being reflected onto the photoelectric transducer. This yields the advantage that the light falling on the photoelectric transducer will be a maximum immediately upon closure of the switch and will remain a maximum for a sufficiently long time to insure that the electrical signal stored in the storage means corresponds to this maximum value. Further, it also assures that sufficient time is available for the aperture to be correctly set prior to exposure of the film. This is particularly important when the light conditions are changing rapidly.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
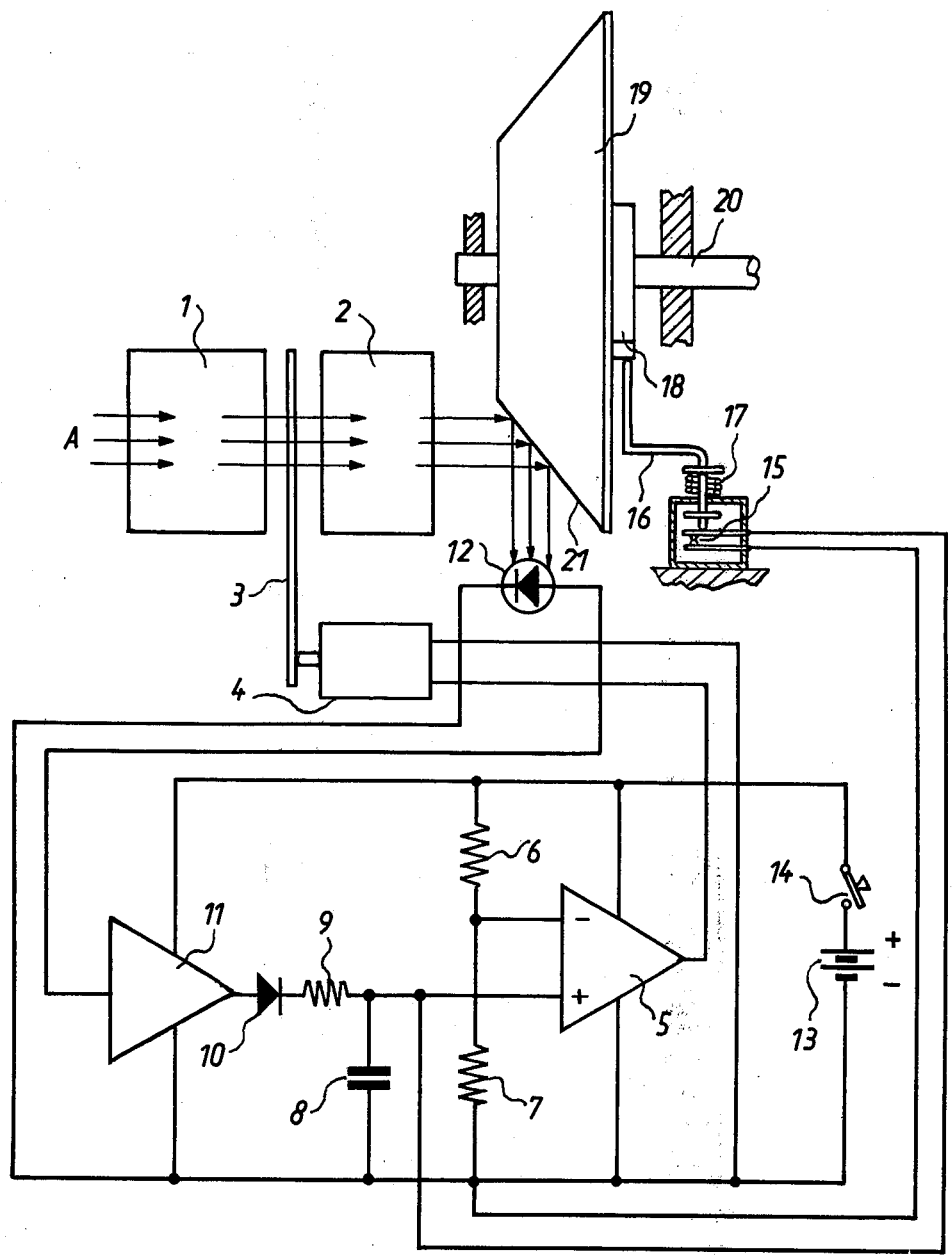
FIG. 1 is a schematic representation of the equipment of the present invention as connected in a motion picture camera.

A preferred embodiment of the present invention will now be described with reference to the drawing.

In FIG. 1 blocks 1 and 2 indicate two parts of the objective of the motion picture camera. Diaphragm leaves 3 are arranged between the above-mentioned parts 1 and 2 and are driven by a drive 4 herein referred to as diaphragm control means. The input of the diaphragm control means is connected to the output of an operational amplifier 5 whose inverting input is connected to a means for furnishing a reference voltage, here a voltage divider having resistors 6 and 7. The direct input of operational amplifier 5 is connected to a capacitor 8, herein referred to as storage means. Capacitor 8 is connected through a resistor 9 and a diode 10 to the output of an amplifier 11. The input to amplifier 11 is connected to a silicon photoreceiver 12, herein referred to as photoelectric transducing means or a light-sensitive element. A battery 13 may be connected to the circuit through a switch 14. A switch 15 is connected in parallel with capacitor 8. Switch 15 is closed by means of a pin 16. A spring 17 acts on pin 16. Pin 16 in turn cooperates with a disc 18 mounted for rotation with rotary shutter 19. The common axis of disc 18 and rotary shutter 19 has reference numeral 20. Rotary shutter 19 has a light reflecting conical surface 21.

Figure 2:
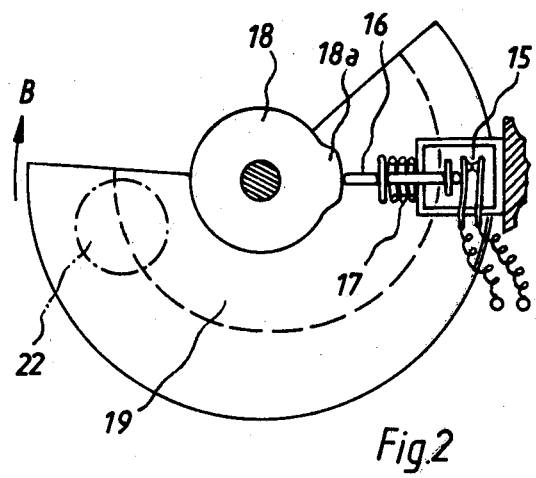
FIG. 2 is a detail illustrating the operating time of switch 15 of FIG. 1 relative to the angle of rotation of the rotary shutter.

As shown in FIG. 2, the aperture 22 is just covered by rotary shutter 19. Pin 16 which is normally urged into a position allowing switch 15 to be opened by means of spring 17, is shown as being closed by a projection 18a of disc 18. Thus for this position of rotary shutter 19 capacitor 8 is short-circuited, that is the storage means are being cleared. Of course as soon as pin 16 no longer makes contact with projection 18a switch 15 will again be opened.

The above-described equipment operates as follows: First, let it be assumed that the diaphragm control means are to be operated to adjust the aperture while the film transport is standing still. Switch 14 is closed. The light travelling through objective 1, 2 in the direction of arrow A is reflected by the light reflecting surface 21 of rotary shutter 19. The light is reflected onto silicon photoreceiver 12 and the resulting electrical signal is amplified in amplifier 11. Since switch 15 is open when rotary shutter 19 is at rest, capacitor 8 is charged through diode 10 and resistor 9. The resultant stored electrical signal, namely the voltage across capacitor 8, is compared to a reference signal, namely the signal at the common point of resistors 6 and 7. If a difference exists between the two signals, a signal appears at the output of differential amplifier 5 which causes the aperture to be adjusted until the signals at the inputs of differential amplifier 5 are equal.

Figure 3:
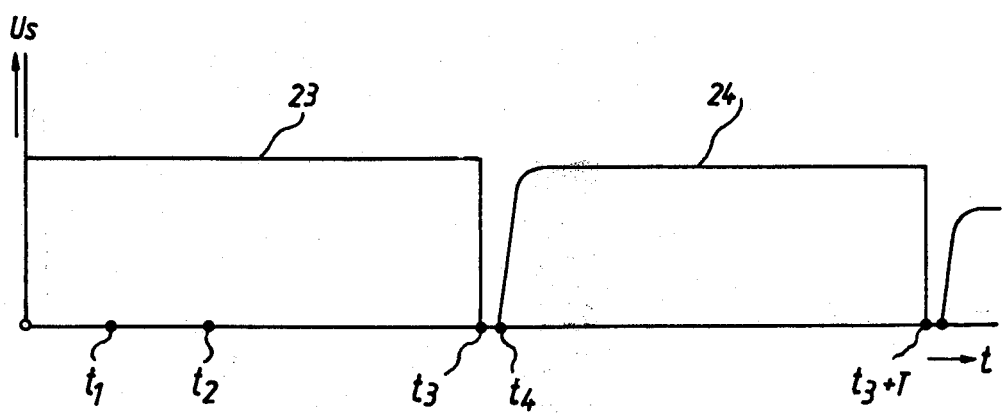
FIG. 3 shows the variation with respect to time of the light-dependent signal furnished by the equipment of the present invention.

Let it now be assumed that the film transport is started after the above process has taken place. Rotary shutter 19 starts to rotate in the direction of arrow B (FIG. 2). As shown in FIG. 3 this takes place at time instance $t_1$. The stored electrical signal retains its value both because the maximum light is still falling on the photoreceiver 12 and because capacitor 8 does not discharge because of diode 10 and the high input impedance of differential amplifier 5. Thus even at time instant $t_2$ where it is assumed that the light reflecting surface leaves the path of the light, the signal across capacitor 8 is maintained. Specifically the signal is maintained until time instant $t_3$ at which point switch 15 is closed by projection 18a. This causes capacitor 8 to be discharged. A predetermined time interval thereafter, namely at time instant $t_4$ switch 15 is again opened so that capacitor 8 can charge to a peak value corresponding to the maximum quantity of light falling on photoreceiver 12. It is assumed in FIG. 3 that the ambient light has decreased somewhat from the first to the second rotation of rotary shutter 19. The peak value of the voltage across capacitor 8, indicated by 23 during the first cycle is thus somewhat greater than that indicated by 24 in the second cycle. After a full rotation, which is assumed to take place in a time interval T, switch 15 is again closed. This process repeats for each rotation of rotary shutter 19. While shutter 19 blocks light from the film, that is during the time that light from the mirrored surface of shutter 19 is reflected onto photoreceiver 12, the voltage on the capacitor has sufficient time to build up to the above-mentioned mentioned peak values and sufficient time is also available for the diaphragm control means to set the aperture to the correct value for the then existing ambient light conditions.

It will be noted that the above-described equipment succeeds in furnishing a light-dependent signal which does not vary as a function of the angular rotation of the shutter. Further the equipment is highly sensitive. Of course it should be noted that the invention is by no means to be limited to the particular types of components shown in the drawing. Specifically, switch 15 can readily be replaced by an electronic switch which may be activated in any known fashion such as for example magnetically or also photoelectrically, during each rotation of the rotary shutter. The storage means are also not to be restricted to a capacitor as shown in a preferred embodiment in the drawing. In general, although the invention has been shown as embodied in electrical circuits, it is not to be restricted to such.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In a motion picture camera having a diaphragm, diaphragm control means for controlling the aperture of said diaphragm in dependence upon a light-dependent signal and a rotary shutter having a light-reflecting surface, equipment for furnishing a light-dependent signal substantially independent of the angular position of said rotary shutter to said diaphragm control means, comprising, in combination, light-sensitive circuit means responsive to light reflected by said light-reflecting surface for furnishing an electric signal corresponding to said light; storage means connected to said light-sensitive circuit means and said diaphragm control means, for storing said electrical signal, and furnishing a corresponding stored electrical signal to said diaphragm control means, said stored electrical signal constituting said light-dependent signal; and clearing means connected to said storage means for clearing said storage means for a predetermined short time period following a predetermined number of rotations of said shutter.

2. Equipment as set forth in claim 1, wherein said light reflected by said light reflecting surface varies from a minimum to a maximum value during each rotation of said shutter, whereby said electrical signal varies from a corresponding minimum to a corresponding maximum value during each of said rotations; and wherein said storage means comprise means for furnishing a stored electrical signal corresponding to said maximum value.

3. Equipment as set forth in claim 2, wherein said clearing means comprise means for clearing said storage means after each rotation of said rotary shutter.

4. Equipment as set forth in claim 1, wherein said light-sensitive circuit means comprise a photoelectric transducing element and an amplifier connected to said photoelectric transducing element.

5. Equipment as set forth in claim 4, wherein said photoelectric transducing element is a silicon photoreceiver.

6. Equipment as set forth in claim 4, wherein said storage means comprise a capacitor connected to the output of said amplifier.

7. Equipment as set forth in claim 6, wherein said clearing means comprise switch means connected in parallel wtih said capacitor for short-circuiting said capacitor, and means coupling said switch means to said rotary shutter in such a manner that said switch means is closed only during said predetermined short time period following each of said rotations of said shutter.

8. Equipment as set forth in claim 6, further comprising a diode interconnected between said capacitor and said amplifier for preventing discharge of said capacitor through said amplifier.

9. Equipment as set forth in claim 7, wherein said coupling means comprise a disc rotating in synchronism with said rotary shutter and having a projection for activating said switch means to short-circuit said capacitor when said projection is in a predetermined position relative to said switch means.

10. Equipment as set forth in claim 9, wherein said disc and said rotary shutter are mounted in such a manner that said projection activates said switch means when said rotary shutter covers said aperture.

11. Equipment as set forth in claim 7, wherein said switch means comprise a mechanical switch.

12. Equipment as set forth in claim 7, wherein said switch means comprise a semi-conductor switch.

13. Equipment as set forth in claim 6, further comprising a differential amplifier having a first input connected to said capacitor, a second input for receiving a reference signal and an output connected to said diaphragm control means for activating said diaphragm control means, and means for furnishing said reference signal to said second input.

14. In a motion picture camera having a diaphragm, diaphragm control means for controlling the aperture of said diaphragm in dependence upon a light-dependent signal and a rotary shutter having a light-reflecting surface, equipment for furnishing a light-dependent signal substantially independent of the angular position of said rotary shutter, comprising, in combination, light-sensitive circuit means including a light-sensitive element mounted to receive light from said light-reflecting surface during a predetermined angle of rotation of said rotary shutter, for furnishing an electrical signal corresponding to the light falling on said light-sensitive element, whereby said electrical signal varies between a maximum and minimum value during each of said rotations of said shutter; storage means connected to said light-sensitive circuit means and said diaphragm control means for storing said maximum value of said electrical signal and furnishing a corresponding stored electrical signal to said diaphragm control means, said stored electrical signal constituting said light-dependent signal; and clearing means connected to said storage means for clearing said storage means for predetermined short time period following a predetermined number of rotations of said rotary shutter.

* * * * *